United States Patent
Kajiwara et al.

(10) Patent No.: US 7,623,258 B2
(45) Date of Patent: Nov. 24, 2009

(54) EXPANSION INFORMATION PROCESSING MODULE FOR IMAGE INFORMATION PROCESSING APPARATUS, SETTINGS INFORMATION INHERITING METHOD, AND SETTING INFORMATION INHERITING PROGRAM

(75) Inventors: Junichi Kajiwara, Nara (JP); Kiyoshi Inoue, Nara (JP); Jun Morimoto, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 861 days.

(21) Appl. No.: 11/181,173

(22) Filed: Jul. 13, 2005

(65) Prior Publication Data
US 2006/0012826 A1   Jan. 19, 2006

(30) Foreign Application Priority Data
Jul. 14, 2004   (JP) .............................. 2004-207565

(51) Int. Cl.
G06F 3/12 (2006.01)
G06F 15/173 (2006.01)

(52) U.S. Cl. ...................... 358/1.15; 709/224; 709/226; 709/238; 370/911

(58) Field of Classification Search ................ 358/1.15; 709/224, 226; 370/911
See application file for complete search history.

(56) References Cited

U.S. PATENT DOCUMENTS

| | | | |
|---|---|---|---|
| 5,724,555 A | | 3/1998 | Wadsworth |
| 6,938,202 B1 * | | 8/2005 | Matsubayashi et al. ...... 715/234 |
| 7,200,678 B1 * | | 4/2007 | Bettadahalli et al. ......... 709/245 |
| 2003/0110398 A1 * | | 6/2003 | Dacier et al. ................. 713/201 |
| 2004/0081104 A1 * | | 4/2004 | Pan et al. ..................... 370/254 |

FOREIGN PATENT DOCUMENTS

| | | |
|---|---|---|
| JP | 09-018639 | 1/1997 |
| JP | 2002-041268 | 2/2002 |

* cited by examiner

*Primary Examiner*—Twyler L Haskins
*Assistant Examiner*—Fred Guillermety
(74) *Attorney, Agent, or Firm*—George W. Nuener; Edwards Angell Palmer & Dodge LLP (57) ABSTRACT

An expansion image processing board 6 (expansion information processing module) of the present invention, which is installable in a network printer 2 having an image processing board 5 (information processing module), includes: a second printer function control section 28 (expansion information processing section) which controls the network printer 2; and a router 31 (data relaying section) which relays data to the second printer function control section 28 or the image processing board 5. Therefore, the expansion image processing board 6 is capable of simply and efficiently extending a functionality of the network printer 2.

9 Claims, 7 Drawing Sheets

| LAN 25 | | NETWORK PRINTER | |
|---|---|---|---|
| PRIVATE ADDRESS | PORT NUMBER | INTRA-DEVICE ADDRESS | PORT NUMBER |
| a1 | A1 | c1 | A1 |
| a1 | ⑀ | c1 | ⑀ |
| a1 | An | c1 | An |

| NETWORK PRINTER | | LAN 25 | |
|---|---|---|---|
| INTRA-DEVICE ADDRESS | PORT NUMBER | PRIVATE ADDRESS | PORT NUMBER |
| a1 | B1 | a1 | B'1 |
| a1 | ⑀ | a1 | ⑀ |
| a1 | Bm | a1 | B'm |

FIG. 5

| LAN 25 | | NETWORK PRINTER | |
|---|---|---|---|
| PRIVATE ADDRESS | PORT NUMBER | INTRA-DEVICE ADDRESS | PORT NUMBER |
| a1 | A1 | c1 | A1 |
| a1 | ∫ | c1 | ∫ |
| a1 | An | c1 | An |
| NETWORK PRINTER | | LAN 25 | |
| INTRA-DEVICE ADDRESS | PORT NUMBER | PRIVATE ADDRESS | PORT NUMBER |
| c1 | B1 | a1 | B1 |
| c1 | ∫ | a1 | ∫ |
| c1 | Bm | a1 | Bm |

FIG. 6

| LAN 25 | | NETWORK PRINTER | |
|---|---|---|---|
| PRIVATE ADDRESS | PORT NUMBER | INTRA-DEVICE ADDRESS | PORT NUMBER |
| a1 | A1 | c1 | A1 |
| a1 | ∫ | c1 | ∫ |
| a1 | An | c1 | An |
| a1 | A'1 | a1 | A1 |
| a1 | ∫ | a1 | ∫ |
| a1 | A'n | a1 | An |

FIG. 7

EXPANSION INFORMATION PROCESSING MODULE FOR IMAGE INFORMATION PROCESSING APPARATUS, SETTINGS INFORMATION INHERITING METHOD, AND SETTING INFORMATION INHERITING PROGRAM

This Nonprovisional application claims priority under 35 U.S.C. § 119(a) on Patent Application No. 207565/2004 filed in Japan on Jul. 14, 2004, the entire contents of which are hereby incorporated by reference.

FIELD OF THE INVENTION

The present invention relates to an expansion information processing module which is installable in an information processing apparatus, for example, an extended functionality interface (EFI) which is installed in a network printer.

BACKGROUND OF THE INVENTION

Figure 7:
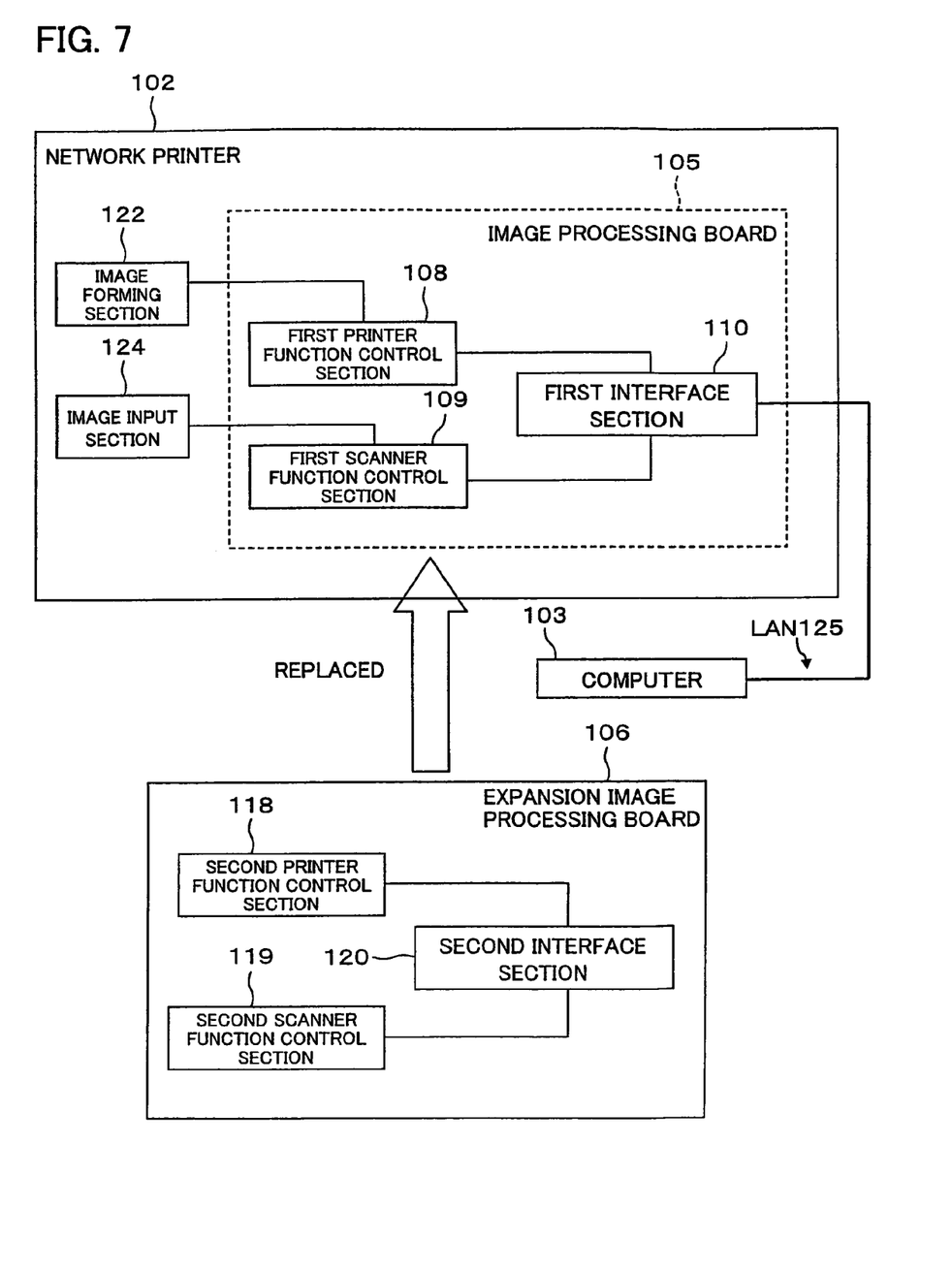
FIG. 7 is a diagram illustrating the conventional example of the case where an expansion image processing board is installed in a network printer.

FIG. 7 is a block diagram illustrating a conventional example of a case where an expansion image processing board 106 (extended functionality interface, also referred to as EFI) is used in a network printer (multifunction printer) 102 having an image processing board 105 installed therein.

The network printer 102 illustrated in FIG. 7 includes an image forming section 122, an image input section 124, and the image processing board 105. The image processing board 105 includes a first printer function control section 108, a first scanner function control section 109, and a first interface section 110. The image processing board 105 is connected through the first interface section 110 to a LAN 125 where a computer 103 of a user exists. The first printer function control section 108 controls the image forming section 122. The first scanner function control section 109 controls the image input section 124.

To the first interface section 110, a10 is assigned as a private IP address on the LAN 25 (a private IP address of the image processing board 105). To the first printer function control section 108, a plurality of ports (port numbers P1 through Pn) respectively corresponding to printer functions are assigned. Similarly, to the first scanner function control section 109, a plurality of ports (port numbers Q1 through Qm) respectively corresponding to scanner functions are assigned.

Image data from the computer 103 of the user is fed to the first printer function control section 108 via the first interface section 110. The first printer function control section 108 outputs a control signal to the image forming section 122 in accordance with the image data. This allows an image to be formed (printed out). Further, scanned data from the image input section 124 is fed to the first scanner function control section 109. The first scanner function control section 109 outputs image data in accordance with the scanned data, and the image data is fed to the computer 103 of the user via the first interface section 110 and the LAN 125.

Now, in order to use the expansion image processing board 106 in the network printer 102, the image processing board 105 is replaced with the expansion image processing board 106 (The image processing board 105 is uninstalled from the network printer 102, and then the expansion image processing board 106 is installed in the network printer 102.).

As illustrated in FIG. 7, the expansion image processing board 106 includes a second printer function control section 118, a second scanner function control section 119, and a second interface section 120. The expansion image processing board 6 allows the network printer 102 to realize functionality greater than that of the image processing board 105.

When the expansion image processing board 106 has been installed in the network printer 102, an intra-device IP address a10 on the LAN 125 is newly assigned to the second interface section 120. Note that, since specified port numbers are generally used for particular functions and particular data exchanges, the second printer function control section 118 uses port numbers P1 through Pn (the same port numbers as those of the first printer function control section 108) respectively corresponding to the printer functions, and the second scanner function control section 119 uses port numbers Q1 through Qm (the same port numbers as those of the first scanner function control section 109) respectively corresponding to the scanner functions.

Given as publicly known documents involving a relevant technique are Japanese Laid-Open Patent Application No. 18639/1997 (Tokukaihei 9-18639; published on Jan. 17, 1997) and Japanese Laid-Open Patent Application No. 41268/2002 (Tokukai 2002-41268; published on Feb. 8, 2002).

However, in the above conventional example, in order to use the expansion image processing board 106, the previously used image processing board 105 must be replaced with the expansion image processing board 106.

Therefore, the image processing board 105 and the expansion image processing board 106 cannot be used in the following manner: the image processing board 105 and the expansion image processing board 106 are used concurrently (the user suitably selects from among the functions of them) so that part of functions of the image processing board 105 previously used by the user (e.g. common functions that are equal in performance between the image processing board 105 and the expansion image processing board 106) is used continuously.

Further, when the expansion image processing board 106 is installed, the LAN 125 must assign a new IP address to the expansion image processing board 106.

SUMMARY OF THE INVENTION

The present invention has been attained in view of the above problem, and an object of the present invention is to provide an expansion information processing module which is capable of simply and efficiently extending functionality of an information processing apparatus.

An expansion information processing module of the present invention, in order to solve the above problem, is an expansion information processing module which is installable in an information processing apparatus having an information processing module, comprising: an expansion information processing section for controlling the information processing apparatus; and a data relaying section for relaying data to the expansion information processing section or the information processing module.

The expansion information processing module is additionally installed in an information processing apparatus having an already installed information processing module, and realizes to enhance a new functionality and the existing functionality.

According to the above arrangement, the data relaying section allows to transmit data, sent from an external entity to the data relaying section, selectively to the expansion information processing section and the information processing module.

Therefore, the previously installed information processing module and the additionally installed expansion information processing module can be used concurrently. With this arrangement, for example, the information processing module and the expansion information processing module can be used, for example, in the following manner: For some functions, functions of the previously installed information processing module are used continuously, whereas for the other functions, functions of the expansion information processing module are used. Thus, functionality of the information processing apparatus can be efficiently extended.

In addition, the above arrangement allows the information processing module to transmit settings information, for example, via the data relaying section to the expansion information processing module, thus simplifying, for example, settings of the expansion information processing module.

The following description will sufficiently clarify further objects, characteristics, and excellent points of the present invention. Further, advantages of the invention will be clarified with reference to the ensuing detailed description taken in conjunction with the accompanying drawings.

DESCRIPTION OF THE EMBODIMENTS

The following will describe one embodiment of the present invention with reference to FIGS. 1 through 7.

An expansion image processing board according to the present invention is additionally installed in a network printer having an image processing board (as a standard component or optional component) having been installed therein. First of all, the following will describe the structure of a network printer having an image processing board installed therein, with reference to FIG. 2.

Figure 1:
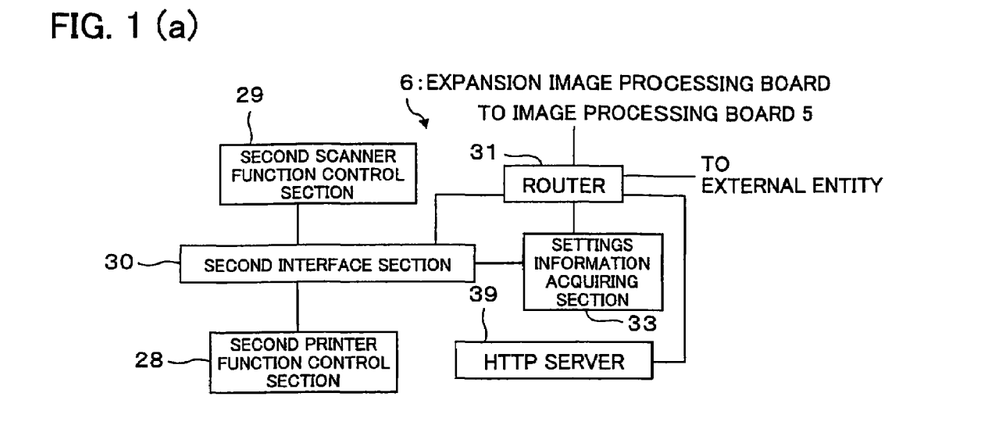
FIG. 1(a) is a block diagram illustrating the structure of an expansion image processing board according to the present invention.
FIG. 1(b) is a block diagram illustrating the structure of a network printer having the expansion image processing board installed therein.
Figure 2:
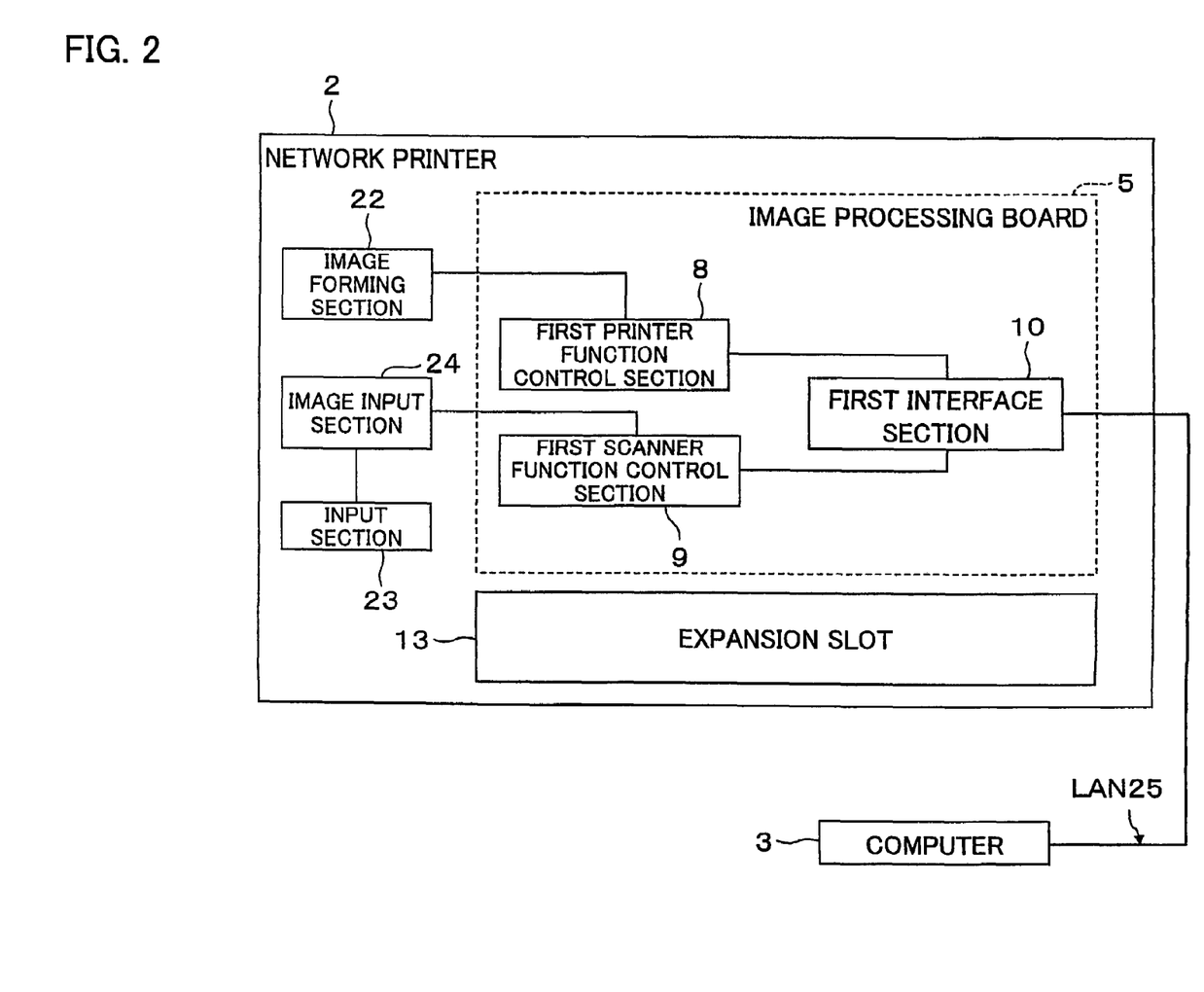
FIG. 2 is a block diagram illustrating a network printer having the expansion image processing board installed therein and its network configuration.

As illustrated in FIG. 2, a network printer 2 (information processing apparatus; image processing apparatus) includes an image forming section 22, an input section 23, an image input section 24, an image processing board 5 (information processing module; image processing module), and an expansion slot 13. The image processing board 5 is an expansion board installed as a standard component or an optional component in the network printer 2. The expansion slot 13 is a slot to install an expansion image processing board 6 (see FIG. 1(a)).

The image processing board 5 includes a first printer function control section 8 which controls the image forming section 22, a first scanner function control section 9 which controls the image input section 24, and a first interface section 10 through which the first printer function control section 8 and the first scanner function control section 9 are connected to a LAN 25 where a computer 3 (user's machine) exists.

To the first interface section 10, a1 is assigned as a private IP address on the LAN 25 (private IP address of the image processing board 5). To the first printer function control section 8, a plurality of ports (port numbers A1 through An) respectively corresponding to printer functions are assigned. To the first scanner function control section 9, a plurality of ports (port numbers B1 through Bm) respectively corresponding to scanner functions are assigned.

For example, print data (having a destination IP address a1) from the computer 3 is fed to the first printer function control section 8 via the first interface section 10. The first printer function control section 8 controls the image forming section 22 in accordance with the print data. This allows the print data to be printed out.

Scanned data from the image input section 24 is fed to the first scanner function control section 9. The first scanner function control section 9 outputs image data in accordance with the scanned data, to the first interface section 10. Then, the image data (having a source IP address a1) is transmitted to the computer 3 via the LAN 25.

Next, FIG. 1(a) illustrates the structure of an expansion image processing board according to the present invention, and FIG. 1(b) illustrates the structure of the network printer having a previously-installed image processing board and an additionally-installed expansion image processing board.

As illustrated in FIG. 1(a), an expansion image processing board 6 (expansion information processing module; expansion image processing module) according to the present invention is provided in the expansion slot 13. The present expansion image processing board 6 includes a second printer function control section 28 (expansion information processing section; expansion image processing section), a second scanner function control section 29 (expansion information processing section; expansion image processing section), a router 31 (data relaying section; data relay switching section), a second interface section 30, a settings information acquiring section 33, and an HTTP server 39. The expansion image processing board 6 allows the network printer 2 to realize a high functionality that is different from a functionality of the image processing board 5. Here, the second printer function control section 28 controls the image forming section 22, and the second scanner function control section 29 controls the image input section 24.

The router 31, as illustrated in FIG. 1(b), is connected to (i) the LAN 25 where the computer 3 exists and (ii) the first interface section 10 of the image processing board 5. For example, the router 31 relays data from the LAN 25 to the first interface section 10 of the image processing board 5 or to the second interface section 30 of the expansion image processing board 6. The second scanner function control section 29 and the router 31 are connected to each other via the second interface section 30. Also, the second printer function control section 28 and the router 31 are connected to each other via the second interface section 30.

The settings information acquiring section 33 acquires settings information of the image processing board 5 from the image processing board 5, and then performs settings on the router 31 and others of the expansion image processing board 6 according to the acquired settings information. The HTTP server 39 is connected to the router 31, and the user of the computer 3 can access the HTTP server 39 via the LAN 25 for changes of settings on the router 31 and others. Note that, the input section 23 performs operation settings on the image input section 24 (scanner function settings).

Thus, the router 31 relays data from the LAN 25 to the first interface section 10 or to the second interface section 30. Therefore, the image processing board 5 and the expansion image processing board 6 are in an intra-device network that is more local than the LAN 25. An IP address on the intra-device network is referred to as an intra-device IP address.

Figure 3:
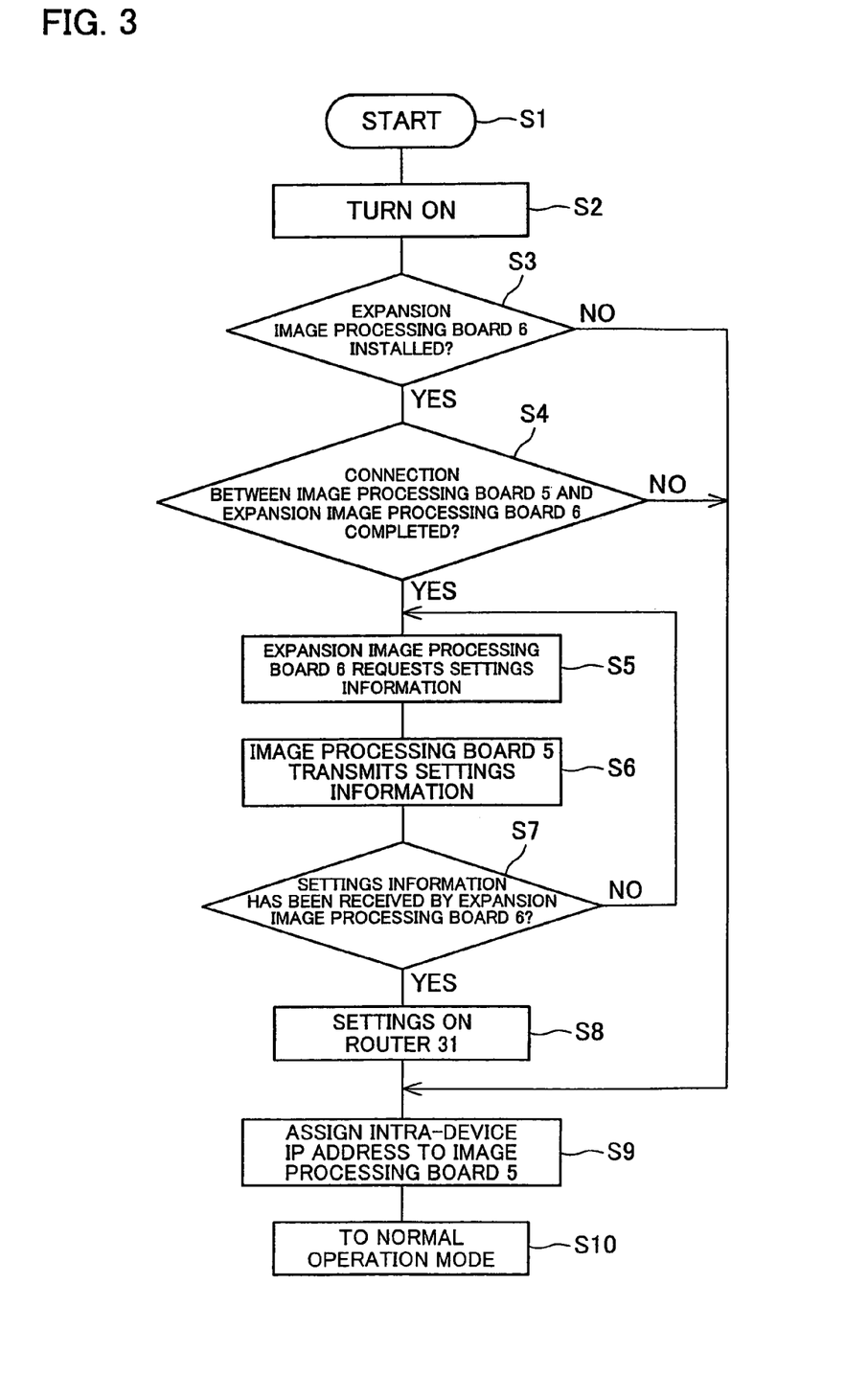
FIG. 3 is a flowchart illustrating a process for inheriting settings information from an image processing board to the expansion image processing board.

Next, the following will describe the process for performing settings on the router 31 and others of the expansion image processing board 6 with reference to a flowchart (S1 through S10) of FIG. 3. As illustrated in FIG. 3, when the network printer 2 is turned on (S2), and the expansion image processing board 6 is installed in the network printer 2 (S3), the router 31 and the first interface section 10 of the image processing board 5 are connected to each other (S4). Note that, if "No" in S3 or S4 (i.e. if the expansion image processing board 6 is not installed in the network printer 2, or if connection between the image processing board 5 and the expansion image processing board 6 is not completed), the network printer 2 shits to a normal operation mode (S10).

Upon completion of the connection in S4, the settings information acquiring section 33 of the expansion image processing board 6 requests to the image processing board 5 settings information (IP address of the image processing board 5 on the LAN 25 and port numbers of the first printer function control section 8 and the first scanner function control section 9) (S5).

In response to the request, the image processing board 5 transmits the settings information to the settings information acquiring section 33 (S6). Upon receipt of the settings information (S7), according to the acquired settings information, the settings information acquiring section 33 performs settings on a private IP address of the router 31, an intra-device IP address of the second interface section 30, port numbers of the second printer function control section 28 and the second scanner function control section 29, and others (S8). In S7, if the expansion image processing board 6 has not received the settings information, the process goes back to S5, and then the expansion image processing board 6 requests the settings information to the image processing board 5.

Then, the router 31 assigns the intra-device IP address to the first interface section 10 of the image processing board 5. Here, the existing private IP address of the first interface section 10 or a new intra-device IP address may be assigned as the intra-device IP address (S9). Upon completion of these steps, the network printer 2 returns to the normal operation mode (S10).

Referring to FIGS. 3 through 7, the following will describe in detail steps for performing settings on the router 31 and others by the settings information acquiring section 33 and a relaying process performed by the router 31.

In S7 of FIG. 3, the settings information acquiring section 33 receives the private IP address (a1) on the LAN 25, the port numbers (A1 through An) of the first printer function control section 8, and the port numbers (B1 through Bm) of the first scanner function control section 9. In S8 and S9, settings on the router 31, the second interface section 30, the second printer function control section 28, the second scanner function control section 29, and the first interface section 10 are performed according to the received settings information.

In this manner, in the router 31, its outside IP address (private IP address) (in the LAN 25) is set to a1 (inheritance of the private IP address of the image processing board 5), and its inside IP address (intra-device IP address) (in the network printer 2) is set to b1. Further, an intra-device IP address of the second interface section 30 is set to c1.

Note that, the settings information acquiring section 33 preferably receives only required settings information from the image processing board 5. For example, under the circumstances where scanner functions of the image processing board 5 (first scanner function control section 9) are used continuously, the settings information acquiring section 33 does not request the port numbers of the first scanner function control section 9 in S5 (see FIG. 3). Further, under circumstances where the image processing board 5 and the expansion image processing board 6 have common functions, the settings information acquiring section 33 selects as a default module one of the image processing board 5 and the expansion image processing board 6 and then performs settings on the router 31. This arrangement is convenient to avoid the user (computer 3) from being confused about which module to select. Note that, as to a function mainly set by the network printer 2 (e.g. scanner function), the previously used image processing board 5 (as a standard component) is more compatible with the network printer 2 in many cases. Therefore, the image processing board 5 is preferably selected as a default module.

Further, port numbers of the second printer function control section 28 are set to A1 through An, and port numbers of the second scanner function control section 29 are set to B1 through Bm (inheritance of function-specific port numbers of the image processing board 5). The intra-device IP address of the first interface section 10 of the image processing board 5 is set to a1, which was previously the private IP address. The port numbers (A1 through An) of the first printer function control section 8 and the port numbers (B1 through Bm) of the first scanner function control section 9 are not changed.

Note that, as to settings on scanner functions, whether to use the image processing board 5 (first scanner function control section 9) or the expansion image processing board 6 (second scanner function control section 29) is determined by the user through the input section 23 of the network printer 2.

Based on the foregoing settings, the router 31 performs NAT (NAPT) conversion as follows.

Figure 4:
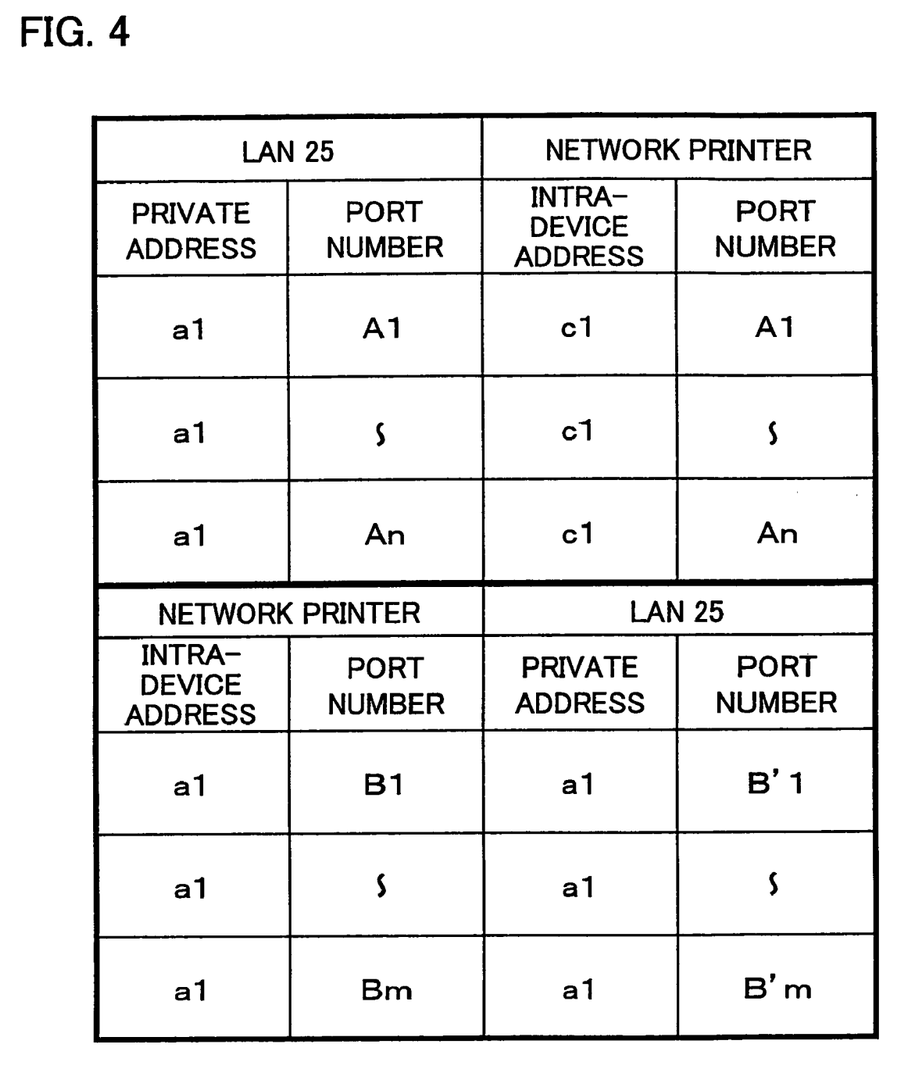
FIG. 4 is a diagram illustrating an NAT (NAPT) conversion table of a router of the expansion image processing board according to the present invention.

FIG. 4 shows an NAT (NAPT) conversion table of the router 31 under circumstances where all printer functions of the image processing board 5 are replaced with those of the expansion image processing board 6 and scanner functions of the image processing board 5 are continuously used.

As illustrated in FIG. 4, under circumstances where all printer functions of the image processing board 5 are replaced with those of the expansion image processing board 6 and scanner functions of the image processing board 5 are continuously used, the router 31 assigns an intra-device IP address c1 to data transmitted from the LAN and having a destination private IP address of a1 and port numbers. A1 through An (converts the private IP address a1 into the intra-device IP address c1). As a result of this, this data (having the private IP address a1 and the port numbers A1 through An) is supplied to the second printer function control section 28 via the second interface section 30 (intra-device IP address c1) of the expansion image processing board 6.

In order to transmit, to the LAN 25, data sent from the first interface section 10 and having a (source) intra-device IP address a1 and port numbers of B1 through Bm, the router 31 assigns to the data a source private IP address a1 and port numbers of B'1 through B'm. This allows the computer 3 to recognize that this data has been processed by the image processing board 5 (first scanner function control section 9).

Figure 5:
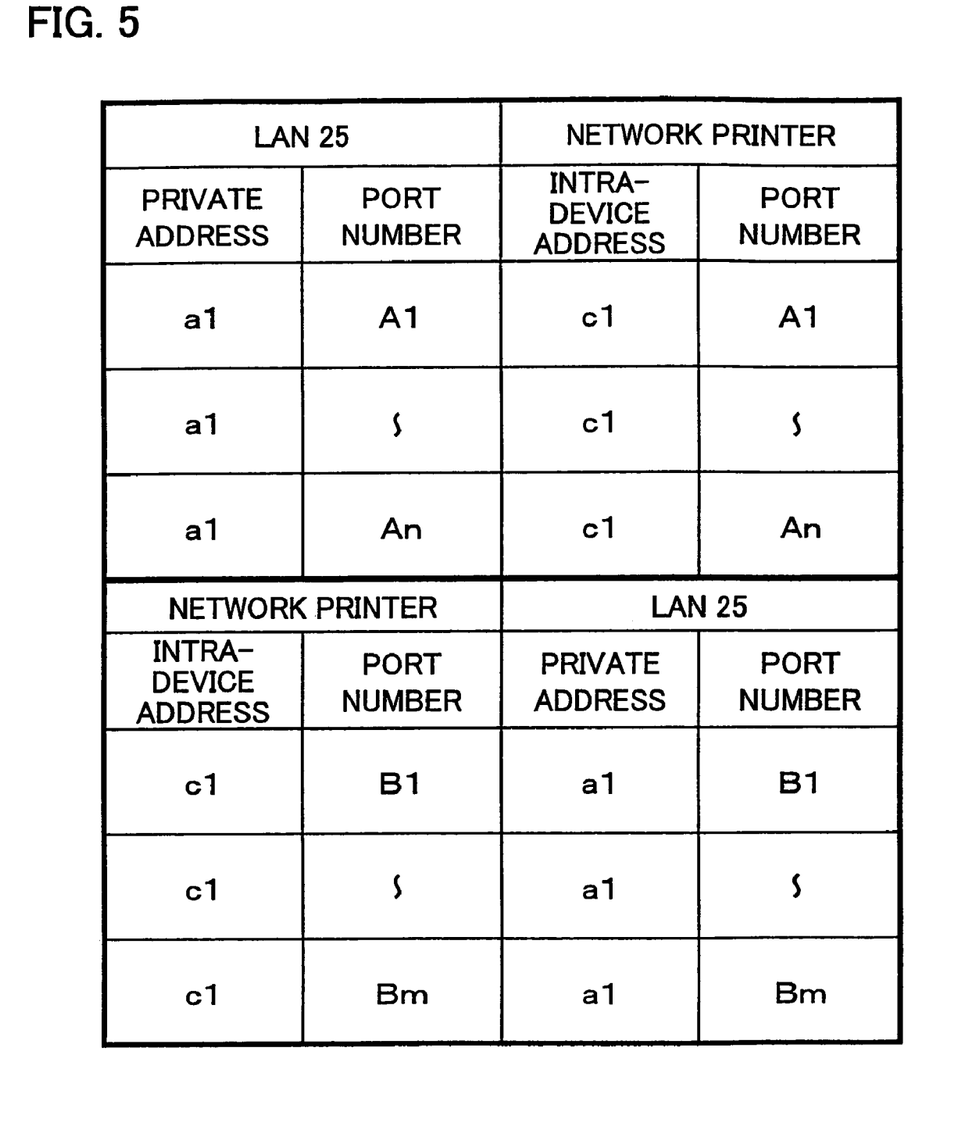
FIG. 5 is a diagram illustrating an NAT (NAPT) conversion table of a router of the expansion image processing board according to the present invention.

FIG. 5 shows an NAT conversion table of the router 31 under the circumstances where all printer functions and all scanner functions of the image processing board 5 are replaced with printer functions and scanner functions of the expansion image processing board 6.

As illustrated in FIG. 5, under circumstances where all printer functions and all scanner functions of the image processing board 5 are replaced with printer functions and scanner functions of the expansion image processing board 6, the router 31 assigns an intra-device IP address c1 to data sent from the LAN and having a private IP address a1 and port numbers A1 through An (converts the private IP address a1 into the intra-device IP address c1). As a result of this, this data (having the private IP address a1 and the port numbers A1 through An) is supplied to the second printer function control section 28 via the second interface section 30 (intra-device IP address c1) of the expansion image processing board 6.

In order to transmit, to the LAN 25, data sent from the second interface section 30 and having a (source) intra-device IP address c1 and port numbers B1 through Bm, the router 31 assigns to the data a source private IP address a1 and port numbers B1 through Bm. This allows the computer 3 to recognize that this data has been processed by the expansion image processing board 6 (second scanner function control section 29).

Figure 6:
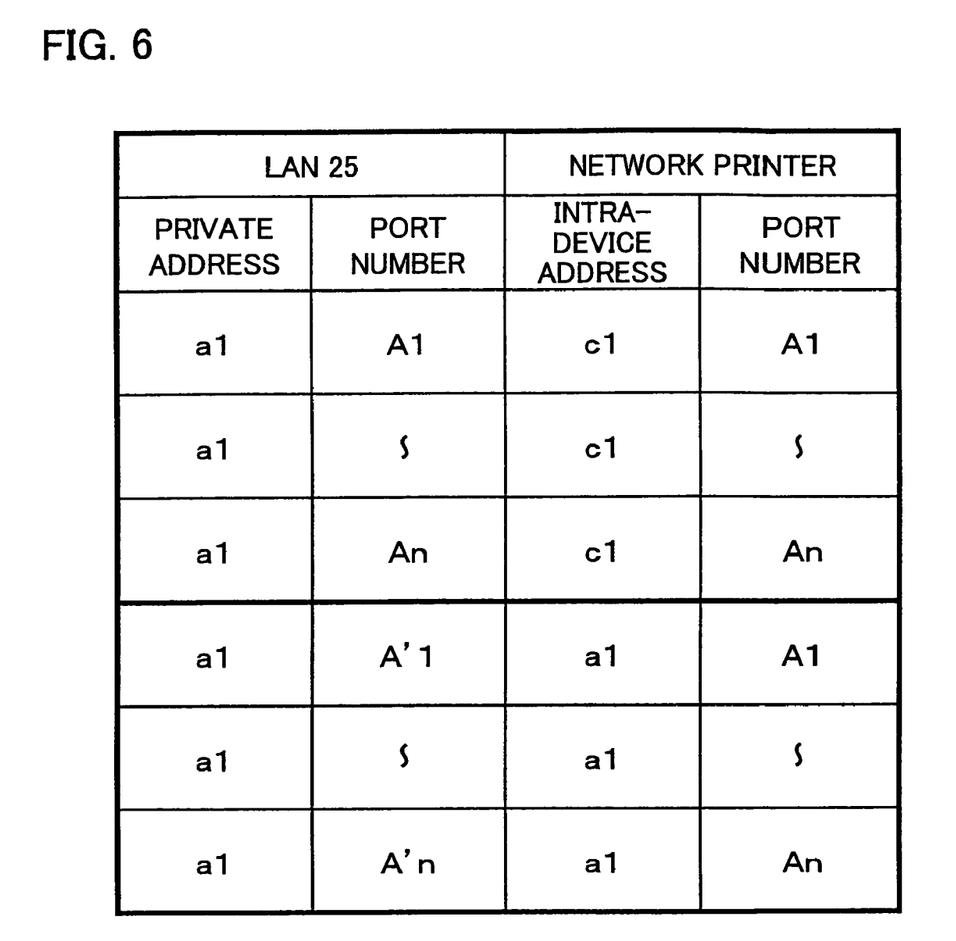
FIG. 6 is a diagram illustrating an NAT (NAPT) conversion table of a router of the expansion image processing board according to the present invention.

FIG. 6 is an NAT conversion (NAPT conversion) table of the router 31 under the circumstances where printer functions of both the image processing board 5 and the expansion image processing board 6 are used.

As illustrated in FIG. 6, under the circumstances where printer functions of both the image processing board 5 and the expansion image processing board 6 are used, the router 31 assigns to data sent from the LAN and having a private IP address a1 and port numbers A'1 through A'n, an intra-device IP address a1 (the private IP address a1 is directly used as the intra-device IP address) and port numbers A1 through An (port numbers A'1 through A'n are converted into A1 through An). As a result of this, this data (having a private IP address a1 and port numbers A'1 through A'n) is fed to the first printer function control section 8 via the first interface section 10 (intra-device IP address a1) of the image processing board 5.

Further, the router 31 assigns to data sent from the LAN and having a private IP address a1 and port numbers of A1 through An, an intra-device IP address c1 (converts the private IP address a1 into the intra-device IP address c1). As a result of this, this data (having private IP address a1 and port numbers A1 through An) is fed to the second printer function control section 28 via the second interface section 30 (intra-device IP address c1) of the expansion image processing board 6.

Thus, according to the expansion image processing board 6, the previously installed image processing board 5 and the additionally installed expansion image processing board 6 can be used concurrently. With this arrangement, the image processing board 5 and the expansion image processing board 6 can be used, for example, in the following manner: For some functions (e.g. scanner functions), functions of the image processing board 5 are used continuously, whereas for the other functions (e.g. printer functions), functions of the expansion image processing board 6 are used. Thus, functionality of the network printer 2 can be efficiently extended. In addition, the above arrangement allows the image processing board 5 to transmit settings information, for example, via the router 31 to the expansion image processing board 6, thus simplifying, for example, settings of the expansion image processing board 6.

Note that, in the present embodiment, the router 31 has the NAT (NAPT) function. However, this is not the only possibility. Alternatively, the router 31 may have a DHCP function, for example.

In the present embodiment, the image processing board 5 and the expansion image processing board 6 may be used in such a manner that the image processing board 5 and the expansion image processing board 6 are installed in advance, and after the settings information are inherited from the image processing board 5 to the expansion image processing board 6, the image processing board 5 is uninstalled so that only the expansion image processing board 6 is used.

The above descriptions have been given based on a case where the expansion image processing board 6 according to the present invention is applied to a network printer. However, this is not the only possibility. Alternatively, even in a non-network environment where a printer is connected to one computer, the image processing board 5 as a standard component and the expansion image processing board 6 can be used concurrently. This allows functionality of the printer to be efficiently extended.

Further, the foregoing expansion image processing board 6 (expansion information processing module, see FIG. 1(*a*)) can be expressed as the one arranged so as to be installed to the network printer 2 (information processing apparatus) having the image processing board 5 (information processing module), comprising an expansion information processing section (second printer function control section 28 and second scanner function control section 29) controlling the network printer 2, wherein the router 31 (data relaying section) performing data path settings is provided on a data path connecting between an external entity on the LAN 25, for example, and the expansion information processing section and connecting between the external entity and the image processing board 5.

As described above, the expansion information processing module of the present embodiment is capable of transmitting data received from an external entity, selectively to the expansion information processing section and the information processing module.

Therefore, the previously installed information processing module and the additionally installed expansion information processing module can be used concurrently. With this arrangement, for example, the information processing module and the expansion information processing module can be used, for example, in the following manner: For some functions, functions of the previously installed information processing module are used continuously, whereas for the other functions, functions of the expansion information processing module are used. Thus, functionality of the information processing apparatus can be efficiently extended.

In addition, the above arrangement allows the information processing module to transmit settings information, for example, via the data relaying section to the expansion information processing module, thus simplifying, for example, settings of the expansion information processing module.

The data relaying section may further have a function of relaying to an external entity (e.g. LAN) data from the expansion information processing section or the information processing module.

In the present embodiment, it is preferable that the information processing module and the data relaying section are each provided with a network interface, and the data relaying section has a router function. The router function is a function of relaying data flowing on one network to another network.

According to the above arrangement, it is possible to selectively transmit data from a network to the expansion information processing module or the information processing module, using the router function of the data relaying section, in an environment where the expansion information processing module and the information processing module are connected to the network. This allows a functionality of an information processing apparatus connected to the network to be efficiently extended.

In the present embodiment, the data relaying section preferably has an NAT function. The NAT function is a function of converting a global IP address in an outside network into a local IP address in an inside network for relaying of data from the outside network to the inner network. Thanks to the data relaying section having the NAT function, redundant IP addresses can be eliminated. Thus, items to be managed on the network can be reduced.

In the present embodiment, it is preferable that the settings information acquiring section for acquiring settings information of the information processing module is provided, and the settings information acquiring section performs settings on the router function according to the settings information.

According to the above arrangement, in performing the settings on the router function (settings on the expansion information processing module), a setting of the previously used information processing module is inherited. This saves a host apparatus on the network from changing its settings. In addition, the settings on the router function is automatically performed by the information processing apparatus. This saves a network (host) from performing settings on the router when the expansion information processing module is installed.

The settings information acquiring section may acquire the settings information of the information processing module via the data relaying section.

According to the present embodiment, it is preferable that an HTTP server which is accessible by an external entity is further provided. This arrangement is convenient because settings on the router function can be changed from the network via the HTTP server.

In the present embodiment, the settings information acquiring section, if the information processing module and the expansion information processing module have common functions, preferably selects one of the modules as a default module so as to perform the settings on the router function. This arrangement is convenient because it eliminates the need for the host to select one of the modules under circumstances where there are common functions between the information processing module and the expansion information processing module.

Note that, as to a function mainly set by the information processing apparatus (e.g. scanner function), the previously used information processing module (as a standard component) is more compatible with the information processing apparatus in many cases. Therefore, the information processing module is preferably selected as a default module.

In the expansion information processing module, information processing performed by the expansion information processing module may be image processing.

An information processing module of the present embodiment is an information processing module which is installed in an information processing apparatus and transmits its own settings information to the expansion information processing module in response to a request for settings information from the expansion information processing module.

A settings information inheriting method of the present embodiment is a method for inheriting settings information of a previously installed information processing module to an expansion information processing module, additionally installed to an information processing apparatus, having a router function, the method comprising the steps of: the expansion information processing module requesting the settings information to the information processing module; the expansion information processing module receiving the settings information from the information processing module; and the expansion information processing module performing settings on the router function according to the received settings information.

Further, a settings information inheriting program of the present embodiment causes a computer to realize the settings information inheriting method.

The present invention is not limited to the aforementioned embodiment and is susceptible of various changes within the scope of the accompanying claims. Also, an embodiment obtained by suitable combinations of technical means disclosed in the embodiment is also included within the technical scope of the present invention.

An expansion information processing module according to the present invention is widely applicable to a printer, a copier, a facsimile machine, a scanner, and a multifunction printer including those functions, for example.

What is claimed is:

1. An expansion information processing module that is installable as a second information processing module in an image information processing apparatus having an information processing module, the expansion information processing module comprising:

an expansion information processing section for controlling the image information processing apparatus;

a data relaying section for relaying data to the expansion information processing section or the first information processing module;

wherein the first information processing module and the data relaying section are each provided with a network interface, and the data relaying section has a router function; and wherein the expansion information processing module further comprises a settings information acquiring section for acquiring settings information of the first information processing module, and the settings information acquiring section performs settings on the router function according to the settings information.

2. The expansion information processing module according to claim 1, wherein:

the data relaying section has an NAT function.

3. The expansion information processing module according to claim 1, further comprising:

an HTTP server which is accessible by an external entity.

4. The expansion information processing module according to claim 1, wherein:

the settings information acquiring section, if the first information processing module and the expansion information processing module have common functions, selects one of the modules as a default module so as to perform the settings on the router function.

5. The expansion information processing module according to claim 4, wherein:

if the common functions are mainly operated by the image information processing apparatus, the settings information acquiring section selects the first information processing module as a default module.

6. The expansion information processing module according to claim 1, wherein:

information processing performed by said expansion information processing module is image processing.

7. An information processing module which, under circumstances where a first expansion information processing module is installed, is installable in an image information processing apparatus having a first information processing module, including: an expansion information processing section for controlling the image information processing apparatus; and a data relaying section for relaying data to the expansion information processing section or the first information processing module, transmits its own settings information to the expansion information processing module, in response to a request for settings information from the expansion information processing module.

8. A settings information inheriting method for inheriting settings information of a previously installed information processing module to an expansion information processing module, additionally installed to an image information processing apparatus, having a router function, the method comprising the steps of:

the expansion information processing module requesting the settings information to the information processing module;

the expansion information processing module receiving the settings information from the information processing module; and the expansion information processing module performing settings on the router function according to the received settings information.

9. A settings information inheriting program stored in a computer readable storage medium for causing a computer to realize a settings information inheriting method for inheriting settings information of a previously installed information processing module to an expansion information processing module, additionally installed to an image information processing apparatus, having a router function, the method comprising the steps of: the expansion information processing module requesting the settings information to the information processing module; the expansion information processing module receiving the settings information from the information processing module; and the expansion information processing module performing settings on the router function according to the received settings information.

* * * * *